US012686432B2

(12) United States Patent
Leuerer et al.

(10) Patent No.: US 12,686,432 B2
(45) Date of Patent: Jul. 21, 2026

(54) ELECTRIC POWER STEERING SYSTEM HAVING A RACK FOR MOVING WHEELS OF A VEHICLE AND METHOD FOR THE INITIAL ASSEMBLY OF AN ELECTRIC POWER STEERING SYSTEM OF THIS KIND

(71) Applicant: ZF Automotive Germany GmbH, Alfdorf (DE)

(72) Inventors: Timm Leuerer, Dusseldorf (DE); Eduard Span, Cologne (DE); Jens Petersen, Ratingen (DE); Gregor Watzlawek, Dusseldorf (DE); Frank Jaehde, Cologne (DE); Yavuz Demir, Lünen (DE); Frederick Wilms, Moenchengladbach (DE); Ali Al-Jabri, Ratingen (DE)

(73) Assignee: ZF Automotive Germany GmbH, Alfdorf (DE)

( * ) Notice: Subject to any disclaimer, the term of this patent is extended or adjusted under 35 U.S.C. 154(b) by 1124 days.

(21) Appl. No.: 17/708,748

(22) Filed: Mar. 30, 2022

(65) Prior Publication Data

US 2022/0315094 A1 Oct. 6, 2022

(30) Foreign Application Priority Data

Mar. 31, 2021 (DE) .......................... 102021203306.7

(51) Int. Cl.
*B62D 3/12* (2006.01)
*B62D 5/04* (2006.01)

(52) U.S. Cl.
CPC ........... *B62D 3/126* (2013.01); *B62D 5/0421* (2013.01); *B62D 5/0454* (2013.01)

(58) Field of Classification Search
CPC ..... B62D 3/126; B62D 5/0421; B62D 5/0454
See application file for complete search history.

(56) References Cited

U.S. PATENT DOCUMENTS

| | | | | |
|---|---|---|---|---|
| 4,641,406 A | * | 2/1987 | Rogers ................... | B21K 1/767 |
| | | | | 29/893.3 |
| 9,328,815 B2 | * | 5/2016 | Nomura .................. | F16H 55/26 |
| 2005/0257991 A1 | | 11/2005 | Ishil et al. | |
| 2013/0340554 A1 | * | 12/2013 | Nomura ................ | B21K 1/768 |
| | | | | 72/462 |
| 2018/0043925 A1 | * | 2/2018 | Anders .................. | B21K 1/767 |

FOREIGN PATENT DOCUMENTS

| | | | | |
|---|---|---|---|---|
| DE | 3636699 A1 | * | 4/1987 | |
| JP | 2002104213 A | * | 4/2002 | |
| JP | 2009120093 A | | 6/2009 | |

(Continued)

*Primary Examiner* — Jacob D Knutson
(74) *Attorney, Agent, or Firm* — Kristin L. Murphy

(57) ABSTRACT

The disclosure relates to an electric power steering system having a rack and a pinion shaft. The pinion shaft meshes with a row of teeth of the rack in an assembled state. To facilitate initial assembly and prevent disengagement during subsequent repair. the rack has an assembly portion at one end of the row of teeth. This portion transitions from the operational teeth and is configured to guide the pinion shaft into engagement. The row of teeth includes first teeth with a first tooth height for normal operation, while the assembly portion has second teeth with a second tooth height that is less than the first tooth height.

12 Claims, 4 Drawing Sheets

(56) References Cited

FOREIGN PATENT DOCUMENTS

| JP | 2010111301 | A | * | 5/2010 | | |
| JP | 2012240638 | A | | 12/2012 | | |
| JP | 2013035383 | A | | 2/2013 | | |
| JP | 2014214810 | A | * | 11/2014 | | |
| JP | 2016222184 | A | * | 12/2016 | | |
| KR | 100814760 | B1 | * | 3/2008 | | |
| WO | WO-2015111595 | A1 | * | 7/2015 | ............. | B21K 1/767 |
| WO | WO-2017033995 | A1 | * | 3/2017 | ............. | B21K 1/762 |

* cited by examiner

ELECTRIC POWER STEERING SYSTEM HAVING A RACK FOR MOVING WHEELS OF A VEHICLE AND METHOD FOR THE INITIAL ASSEMBLY OF AN ELECTRIC POWER STEERING SYSTEM OF THIS KIND

CROSS-REFERENCE TO RELATED APPLICATION

This application claims priority to German Patent Application No. 102021203306.7, filed Mar. 31, 2021, the disclosure of which is incorporated herein by reference in its entirety.

TECHNICAL FIELD

The disclosure relates to an electric power steering system having a rack for steering wheels of a vehicle and having a pinion shaft, the pinion shaft meshing with a row of teeth of the rack in an assembled state, and the rack having an assembly portion for the initial assembly of the pinion shaft, one end of the row of teeth transitioning into the assembly portion. The disclosure also relates to a method for the initial assembly of an electric power steering system of this kind.

BACKGROUND

An electric power steering system of this type is known from US 2005/0257991 A1. This is based on prior art in which the rack has a continuous row of teeth having teeth of the same type over the entire row of teeth. However, this makes the initial assembly and in particular the arrangement of the pinion shaft more difficult. It is therefore proposed according to the above-mentioned document that the rack has an assembly portion for the initial assembly of the pinion shaft. Here, the assembly portion is designed as a toothless recess at one end of the row of teeth. This facilitates the assembly of the pinion shaft.

However, it is disadvantageous that, during repair work after the initial assembly, the connection between the pinion shaft and the row of teeth of the rack can be lost. For example, when replacing a tie rod or an inner tie rod joint, the rack can be shifted or displaced or moved after the initial assembly has been carried out such that the pinion shaft returns to the assembly portion, resulting in the pinion shaft and the row of teeth of the rack becoming disengaged from one another. As a result, the defined positioning of the pinion shaft in relation to the row of teeth of the rack during the initial assembly is at risk of being lost. As a result, for example, a sensor system for detecting the steering position and/or a central position of the steering may need to then be recalibrated.

The problem sought to be addressed by the disclosure is that of developing an electric power steering system and/or a method of the type mentioned at the outset such that, on the one hand, initial assembly for establishing a connection between the pinion shaft and the row of teeth of the rack is facilitated and, on the other hand, the connection between the pinion shaft and the row of teeth of the rack is prevented from breaking during repair measures carried out after the initial assembly. In particular, an alternative arrangement is to be provided.

SUMMARY

The disclosure relates to an electric power steering system. A power steering system of this kind makes it possible to reduce a force which is required for operating a steering wheel of a vehicle during steering. In particular, the power steering system assists a driver in steering by augmenting the steering force applied by the driver by an electric motor. In one exemplary arrangement, the system is an electromechanical power steering system. An electric motor can support the steering movements made by the driver. Such an electromechanical power steering system can also be referred to by the abbreviation EPS (EPS=electric power steering). The electric motor of the electromechanical power steering system can be operatively connected to a rack, in particular by a pinion shaft.

The electric power steering system has a rack for steering wheels of a vehicle, in particular a motor vehicle. In one exemplary arrangement, the rack for steering the wheels can be moved linearly. In one exemplary arrangement, when the electric power steering system is located in the vehicle, the rack is oriented transversely to the longitudinal direction of the vehicle. The electric power steering system also has a pinion shaft. In an assembled state of the electric power steering system, the pinion shaft meshes with a row of teeth of the rack. As a result, a rotary movement of the pinion shaft can be converted into a linear movement of the rack. In one exemplary arrangement, the pinion shaft and/or the rack, in particular the row of teeth of the rack, can have helical teeth. The rack has an assembly portion for an initial assembly of the pinion shaft. Here, one end of the row of teeth transitions into the assembly portion. Said one end of the row of teeth and the assembly portion are arranged so as to be directly adjacent to one another. In particular, after final assembly of the electric power steering system in the vehicle and during normal use of the vehicle, the pinion shaft interacts with the row of teeth of the rack, and a transition into the assembly portion is prevented. In particular, the row of teeth is arranged in a working portion of the rack, or the row of teeth forms a working region of the rack. In normal use of the vehicle, the pinion shaft is located in the working region of the rack. It is only when repairing the steering system of the vehicle, for example when replacing a tie rod and/or an inner tie rod joint, that the pinion shaft can return to the region of the assembly portion.

According to the disclosure, the first teeth of the row of teeth of the rack each have a first tooth height. The assembly portion has second teeth for interacting with the pinion shaft, the second teeth each having a second tooth height that is less than the first tooth height.

This arrangement is advantageous in that, after the initial assembly of the pinion shaft and/or the electric power steering system has been carried out, in particular during subsequent repair measures, the pinion shaft is always, or at any given time, operatively connected to the row of teeth or the rack in a defined and predetermined manner. Even during repair measures after the initial assembly and when the pinion shaft transitions into the assembly portion, at least one pinion shaft tooth meshes with the second teeth of the assembly portion of the rack. This prevents undefined rotation of the pinion shaft in an assembly portion without teeth and/or during a repair measure following the initial assembly. At the same time, due to the lower second tooth height in relation to the first tooth height, sufficiently simple initial assembly of the pinion shaft is ensured and/or sufficient installation space for the initial assembly can be provided.

In one exemplary arrangement, one end of the working portion of the rack transitions into the assembly portion of the rack. The first teeth or all of the first teeth of the working portion each have the first tooth height. All of the second teeth of the assembly portion can have the second tooth height, which is less than the first tooth height.

In one exemplary arrangement, the second tooth height is less than half or less than a third of the first tooth height. In one exemplary arrangement, in the assembly portion, less than half or less than a third of a further tooth height of a pinion shaft tooth of the pinion shaft meshes with the second teeth of the rack, between two second teeth of the rack. Since the second tooth height is less than the first tooth height, there is sufficient installation space for the initial assembly of the pinion shaft.

According to a development, the first teeth of the rack each have a tooth root and a tooth tip. In particular, the sum of the height of the tooth root and the height of the tooth tip defines the first tooth height. The second teeth of the rack each have, a tooth root. The height of the tooth root of the second teeth defines the second tooth height. Here, the tooth root of each of the second teeth can correspond to the tooth root of a first tooth. In particular, the second teeth are each formed without a tooth tip. During production of the rack, the assembly portion can initially be formed with teeth corresponding to the first teeth of the row of teeth, with the tooth tips of the second teeth being subsequently removed to form the assembly portion of the rack. This removal of the tooth tips of the second teeth can be carried out, for example, by machining.

According to a further exemplary arrangement, the pinion shaft extends, in the assembled state, through a shaft passage of a rack housing. In particular, the rack housing is designed to receive and/or guide the rack. The shaft passage extends transversely or at right angles to the longitudinal extension of the rack housing and/or the rack. A central portion of the shaft passage has a recess, the pinion shaft and the rack being engaged with one another in the region of the recess. In one exemplary arrangement, a central longitudinal axis of the pinion shaft extends, in the assembled state, in parallel with a central longitudinal axis of the shaft passage. In the assembled state, the central longitudinal axis of the pinion shaft preferably coincides with the central longitudinal axis of the shaft passage.

According to a further exemplary arrangement, for the initial assembly, the central longitudinal axis of the pinion shaft can be inserted into the shaft passage and/or arranged within the shaft passage obliquely or transversely to the central longitudinal axis of the shaft passage. As a result, one end of the pinion shaft can be guided past the assembly portion of the steering rod. The installation space required for this and/or the possibility of guiding the pinion shaft past the rack is provided by the lower height of the second tooth height in relation to the first tooth height. In particular, for the initial assembly, the pinion shaft is arranged in the shaft passage in such a way that two ends of the pinion shaft that face away from one another protrude out of the shaft passage.

In the assembled state of the electric power steering system, a first end of the pinion shaft is connected to a steering rod and/or a steering rod arrangement. A steering wheel can be arranged at one end of the steering rod and/or the steering rod arrangement that faces away from the pinion shaft. In particular, in the assembled state of the electric power steering system, a second end of the pinion shaft that faces away from the first end is connected to an electric motor. Here, a gear or worm gear can be arranged between the second end of the pinion shaft and the electric motor.

According to a further exemplary arrangement, the shaft passage has a plurality of portions of different inside diameters, the central portion of the shaft passage having a first inside diameter and the first inside diameter being the smallest inside diameter of the shaft passage. In particular, starting from the central portion and going outward, the other portions of the shaft passage have inside diameters that increase in steps and/or continuously. The other portions thus have other inside diameters which are larger than the first inside diameter of the central portion. This enables and/or simplifies insertion of the pinion shaft, during the initial assembly, obliquely to the central longitudinal axis of the shaft passage.

In particular, the pinion shaft has a maximum outside diameter that is less than or equal to the first inside diameter of the central portion of the shaft passage. The first end of the pinion shaft has a maximum outside diameter. In particular, the second end of the pinion shaft has a smaller outside diameter than the first end of the pinion shaft. This, in cooperation with the other portions of the shaft passage, facilitates oblique insertion of the pinion shaft into the shaft passage during the initial assembly. During initial assembly, the pinion shaft is inserted into the shaft passage with its first end first.

A method for the initial assembly of the electric power steering system according to the disclosure in which, for the initial assembly, the central longitudinal axis of the pinion shaft is inserted into the shaft passage and/or arranged within the shaft passage obliquely or transversely to the central longitudinal axis of the shaft passage is particularly advantageous. In one exemplary arrangement, the first end of the pinion shaft is guided past the assembly portion of the rack.

In one exemplary arrangement, after the pinion shaft has been inserted and/or arranged within the shaft passage, the pinion shaft is brought into engagement with the assembly portion of the rack. For this purpose, the central longitudinal axis of the pinion shaft is arranged and/or aligned in parallel with the central longitudinal axis of the shaft passage. In one particular exemplary arrangement, the central longitudinal axis of the pinion shaft then coincides with the central longitudinal axis of the shaft passage.

In particular, the electric power steering system produced using the method according to the disclosure is an electric power steering system according to the disclosure as described above. The method is developed in accordance with the exemplary arrangements explained in connection with the electric power steering system according to the disclosure described here. Furthermore, the electric power steering system described here can be developed in accordance with the exemplary arrangements explained in connection with the method.

BRIEF DESCRIPTION OF DRAWINGS

The disclosure is explained in more detail below with reference to the drawings. In this case, the same reference signs relate to the same, similar, or functionally identical components or elements. In the drawings.

DETAILED DESCRIPTION

Figure 1:
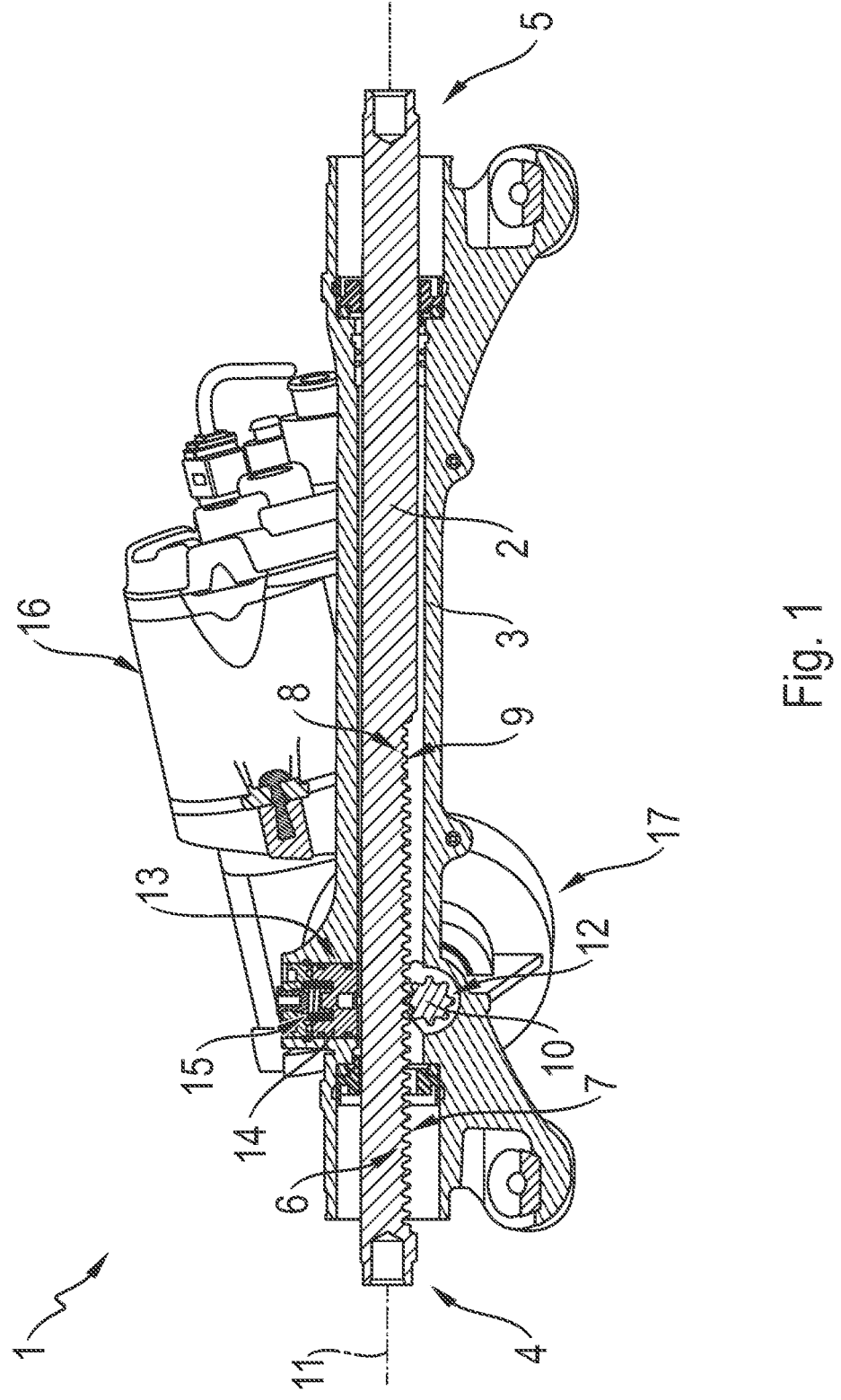
FIG. 1 is a partial sectional side view of a power steering system according to an exemplary arrangement of the disclosure.

FIG. 1 is a partial sectional side view of a power steering system 1 according to an exemplary arrangement of the disclosure. In this exemplary arrangement, the power steering system 1 is designed as an electromechanical power steering system. The power steering system 1 has a rack 2. The rack 2 is arranged and movably mounted in a rack housing 3. Here, the rack 2 is guided in the rack housing 3 such that it can move linearly in the longitudinal direction of the rack 2 and in relation to the rack housing 3. The rack 2 has two rack ends 4, 5 arranged such that they face away from one another. In an assembled state of the power steering system 1 in a vehicle (not shown in detail), the two rack ends 4, 5 are each connected to a tie rod (not shown in detail) or an inner tie rod joint (not shown in detail).

The rack 2 has a row of teeth 6 having first teeth 7. For the sake of clarity, not all first teeth 7 are provided with a reference sign. The row of teeth 6 forms a working portion of the rack 2. In addition, the rack 2 has an assembly portion 8. Here, one end of the row of teeth 6 or of the working portion transitions into the assembly portion 8. In other words, the row of teeth 6 and the assembly portion 8 are arranged so as to be directly adjacent to one another. The assembly portion 8 has second teeth 9. For the sake of clarity, not all second teeth 9 are provided with a reference sign. It can be seen that the first teeth 7 have a first tooth height that is greater than a second tooth height of the second teeth 9.

The power steering system 1 also has a pinion shaft 10. In this embodiment, the pinion shaft 10 extends transversely or at right angles to the rack 2 or to a central longitudinal axis 11 of the rack 2. In the assembled state shown here, the pinion shaft 10 meshes with the row of teeth 6 of the rack 2. The pinion shaft 10 is arranged in a shaft passage 12 of the rack housing 3.

In this exemplary arrangement, the power steering system 1 has a pretensioning device 13. The pretensioning device 13 is arranged on a side of the rack 2 that faces away from the pinion shaft 10. The pretensioning device 13 applies a predetermined force is applied to the rack 2 in the direction of the pinion shaft 10. This ensures that the pinion shaft 10 and the rack 2 interact in a sufficiently reliable manner. In this exemplary arrangement, the pretensioning device 13 has a pressure piece 14 which is pressed against the rack 2 by a spring element 15.

The electromechanical power steering system 1 has an electric motor 16. The electric motor 16 is connected to the pinion shaft 10 by a gear 17. In this exemplary arrangement, the gear 17 is designed as a worm gear.

Figure 2:
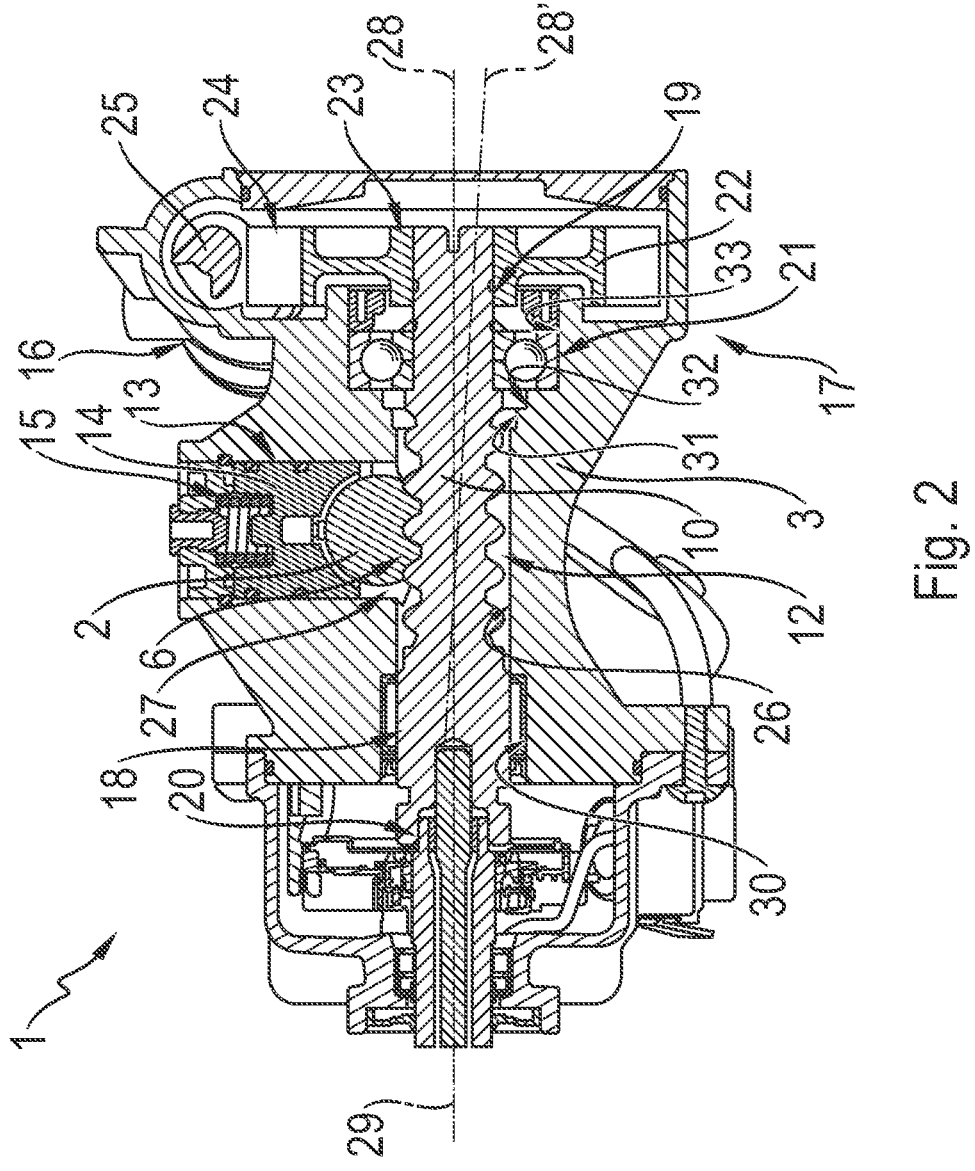
FIG. 2 is a cross section of the power steering system according to the disclosure according to FIG. 1.

FIG. 2 is a cross section of the power steering system 1 according to the disclosure according to FIG. 1. The same features have the same reference signs. In this respect, reference is also made to the preceding description. The pinion shaft 10 has two ends 18, 19 that face away from one another.

The first end 18 of the pinion shaft 10 is connected to a multi-part steering rod arrangement 20 in the assembled state shown here. One end of the steering rod arrangement 20 (not shown in detail) that faces away from the pinion shaft 10 is connected or can be connected to a steering wheel (not shown in detail).

The second end 19 of the pinion shaft 10 is rotatably mounted in a bearing 21. Here, in the exemplary arrangement shown, the bearing 21 is designed as a ball bearing. Furthermore, the second end 19 is connected to the electric motor 16 by the gear 17. In this exemplary arrangement, the second end 19 is connected to a worm wheel 22 of the gear 17. For this purpose, a hub portion 23 of the worm wheel 22 is pushed or pressed onto the second end 19. A gear rim 24 of the worm wheel 22 is operatively connected to a worm shaft 25 of the gear 17. The worm shaft 25 can be driven by the electric motor 16 or is connected thereto.

In the assembled state shown here, the pinion shaft 10 extends through the shaft passage 12, a central portion 26 of the shaft passage 12 having a recess 27. The pinion shaft 10 and the rack 2 are engaged with one another in the region of the recess 27. In the assembled state shown here, a central longitudinal axis 28 of the pinion shaft 10 and a central longitudinal axis 29 of the shaft passage 12 coincide.

The central portion 26 of the shaft passage 12 has a first inside diameter, this first inside diameter also being the smallest inside diameter of the shaft passage 12. In addition to the central portion 26, the shaft passage 12 has a plurality of other portions 30, 31, 32, 33. Starting from the central portion 26 and going outward, the other portions 30, 31, 32, 33 have, in this exemplary arrangement, other inside diameters that increase in steps.

For initial assembly of the pinion shaft 10, the rack 10 is arranged in the rack housing 3 in such a way that the assembly portion 8 is arranged in the region of the recess 27. Then, the pinion shaft 10 is inserted, with its first end 18 first, through the shaft passage 12 into said passage. For the initial assembly, as shown schematically here, the central longitudinal axis 28' of the pinion shaft 10 is oblique to the central longitudinal axis 29 of the shaft passage 12, as a result of which the first end 18 of the pinion shaft 10 can be guided past the assembly portion 8 of the rack 2. The installation space required for the oblique insertion of the pinion shaft 10 is provided due to the second teeth 9 having the smaller tooth height and the other portions 30, 31, 32, 33 having the larger inside diameters.

After the pinion shaft 10 has been inserted and/or arranged within the shaft passage 12, the pinion shaft 10 is brought into engagement with the second teeth 9 of the assembly portion 8. For this purpose, the central longitudinal axis 28' of the pinion shaft 10 is arranged, according to the length of the central longitudinal axis 28, in parallel with the central longitudinal axis 29 of the shaft passage 12. In this exemplary arrangement, the central longitudinal axes 28' and 28 of the pinion shaft 10 and the central longitudinal axis 29 of the shaft passage 12 are arranged in such a way that they coincide.

Figure 3:
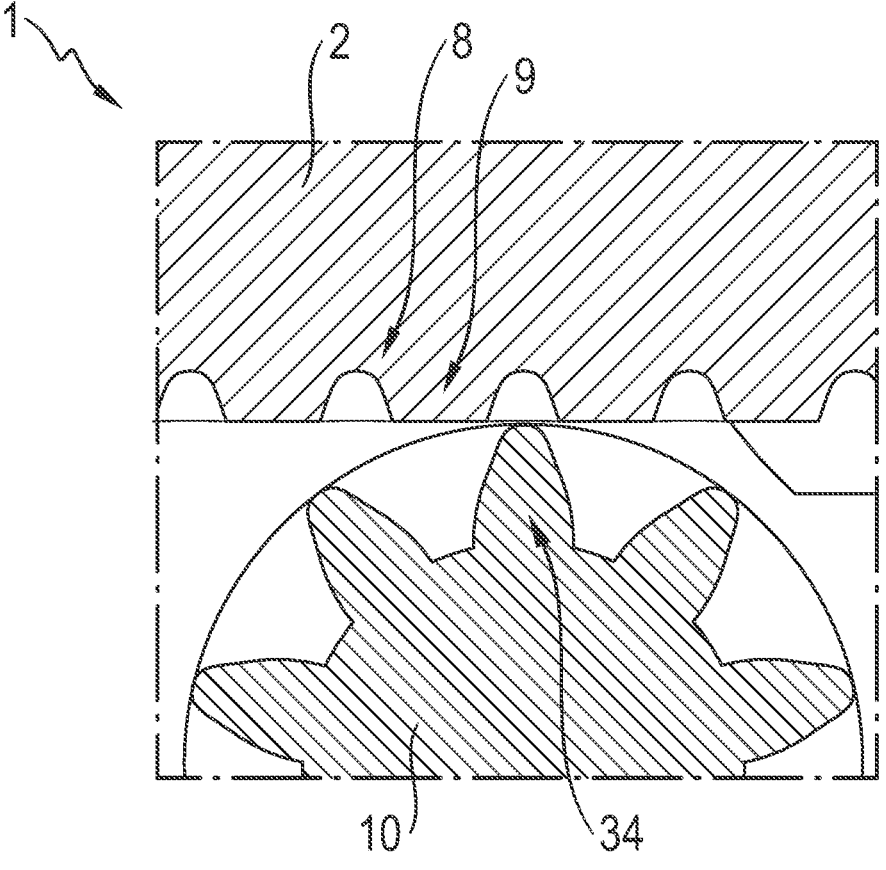
FIG. 3 is a detail of a sectional side view of the power steering system according to the disclosure during initial assembly.

FIG. 3 is a detail of a sectional side view of the power steering system 1 according to the disclosure during initial assembly. Said figure shows the positioning of the pinion shaft 10 during the initial assembly and with an oblique arrangement of the central longitudinal axis 28' in relation to the central longitudinal axis 29 of the shaft passage 12, as indicated in FIG. 2. It can be seen that, for the initial assembly, the pinion shaft 10 can be guided past the second teeth 9 of the assembly portion 8 of the rack 2 with a sufficient distance therefrom.

The pinion shaft 10 has a plurality of pinion shaft teeth 34. For the sake of clarity, not all pinion shaft teeth 34 are provided with a reference sign. It can be seen that, in this exemplary arrangement, the tooth height of the second teeth 9 of the assembly portion 8 of the rack 2 is less than half the tooth height of the pinion shaft teeth 34. In this exemplary arrangement, the second teeth 9 of the rack 2 are each formed exclusively from a tooth root.

Figure 4:
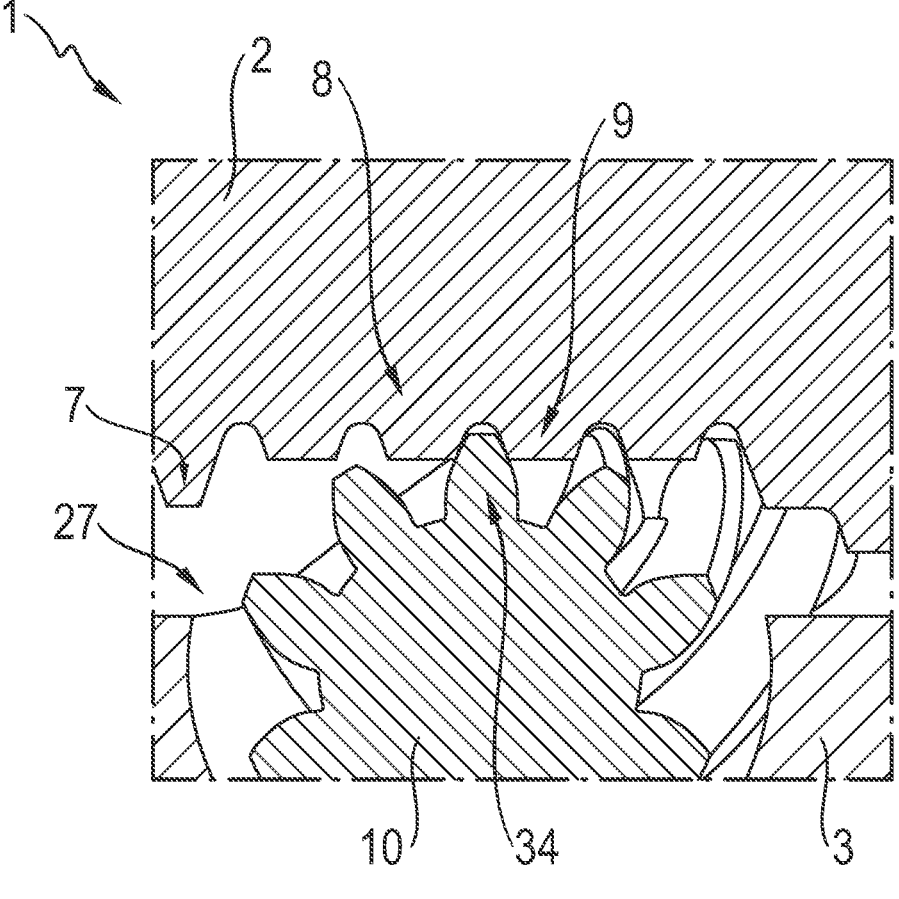
FIG. 4 is a detail of a sectional side view of the power steering system according to the disclosure after the initial assembly.

FIG. 4 is a detail of a sectional side view of the power steering system 1 according to the disclosure after the initial assembly. After the initial assembly and thus in the assembled state, the central longitudinal axis 28 of the pinion shaft 10 and the central longitudinal axis 29 of the shaft passage 12 coincide according to FIG. 2. In addition, the pinion shaft 10 and the second teeth 9 of the assembly portion 8 of the rack 2 are engaged with one another. In this exemplary arrangement, less than half of the tooth height of the pinion shaft tooth 34 engages in a space between two adjacent second teeth 9 of the rack 2.

A first tooth 7 of the row of teeth 6 of the rack 2 according to FIG. 1 can be seen next to the assembly portion 8. The first teeth 7 of the rack 2 each have a tooth root and a tooth tip, whereas the second teeth 9 each have exclusively a tooth root and are therefore designed without a tooth tip. The tooth tips of the first teeth 7 and the second teeth 9 are of the same design in this exemplary arrangement.

If repair measures are required for a steering system of a vehicle comprising the power steering system 1, the interaction of the pinion shaft 10 with the second teeth 9 of the assembly portion 8 prevents undesired and/or uncontrolled rotation of the pinion shaft 10 in relation to the rack 2.

The invention claimed is:

1. An electric power steering system, comprising a rack for steering wheels of a vehicle and having a pinion shaft, wherein the pinion shaft meshes with a row of teeth of the rack in an assembled state, and the rack has an assembly portion for an initial assembly of the pinion shaft, only one end of the row of teeth transitioning into the assembly portion, wherein first teeth of the row of teeth each have a first tooth height and the assembly portion has second teeth for interacting with the pinion shaft, the second teeth each having a second tooth height that is less than the first tooth height, wherein the pinion shaft extends, in the assembled state, through a shaft passage of a rack housing, a central portion of the shaft passage having a recess and the pinion shaft and the rack being engaged with one another in a region of the recess, and wherein a central longitudinal axis of the pinion shaft extends, in the assembled state, in parallel with a central longitudinal axis of the shaft passage.

2. The electric power steering system according to claim 1, wherein the second tooth height is less than half of the first tooth height.

3. The electric power steering system according to claim 2, wherein the first teeth of the rack each have a tooth root and a tooth tip, and the second teeth of the rack each have a tooth root, wherein the tooth root of the second teeth corresponds to the tooth root of the first teeth, the second teeth each being formed without a tooth tip.

4. The electric power steering system according to claim 1, wherein the first teeth of the rack each have a tooth root and a tooth tip, and the second teeth of the rack each have a tooth root, wherein the tooth root of the second teeth corresponds to the tooth root of the first teeth, the second teeth each being formed without a tooth tip.

5. The electric power steering system according to claim 1, wherein for the initial assembly, a central longitudinal axis of the pinion shaft can be inserted into the shaft passage and arranged within the shaft passage obliquely or transversely to a central longitudinal axis of the shaft passage, as a result of which one end of the pinion shaft can be guided past the assembly portion of the rack.

6. The electric power steering system according to claim 5 wherein the shaft passage has a plurality of portions having different inside diameters, the central portion of the shaft passage having a first inside diameter and the first inside diameter being the smallest inside diameter of the shaft passage.

7. The electric power steering system according to claim 6, wherein starting from the central portion and going outward, the other portions of the shaft passage have inside diameters which increase in steps and/or continuously.

8. The electric power steering system according to claim 1, wherein the shaft passage has a plurality of portions having different inside diameters, the central portion of the shaft passage having a first inside diameter and the first inside diameter being the smallest inside diameter of the shaft passage.

9. The electric power steering system according to claim 1, wherein the second tooth height is less than a third of the first tooth height.

10. The electric power steering system according to claim 1, wherein a central longitudinal axis of the pinion shaft coincides, in the assembled state, with the central longitudinal axis of the shaft passage.

11. An electric power steering system, comprising a rack for steering wheels of a vehicle and having a pinion shaft, wherein the pinion shaft meshes with a row of teeth of the rack in an assembled state, and the rack has an assembly portion for an initial assembly of the pinion shaft, only one end of the row of teeth transitioning into the assembly portion, wherein first teeth of the row of teeth each have a first tooth height and the assembly portion has second teeth for interacting with the pinion shaft, the second teeth each having a second tooth height that is less than the first tooth height, wherein the pinion shaft extends, in the assembled state, through a shaft passage of a rack housing, a central portion of the shaft passage having a recess and the pinion shaft and the rack being engaged with one another in a region of the recess, and wherein the shaft passage has a plurality of portions having different inside diameters, the central portion of the shaft passage having a first inside diameter and the first inside diameter being the smallest inside diameter of the shaft passage.

12. The electric power steering system according to claim 11, wherein starting from the central portion and going outward, the other portions of the shaft passage have inside diameters which increase in steps and/or continuously.

* * * * *